United States Patent
Poulsen et al.

(10) Patent No.: US 7,593,401 B2
(45) Date of Patent: Sep. 22, 2009

(54) QUERY LOAD BALANCING FOR INTERNET GROUP MANAGEMENT PROTOCOL (IGMP) GENERAL MEMBERSHIP QUERIES (GMQS)

(75) Inventors: Allan Poulsen, Kanata (CA); Gregory Gyetko, Dunrobin (CA)

(73) Assignee: Alcatel Lucent, Paris (FR)

( * ) Notice: Subject to any disclaimer, the term of this patent is extended or adjusted under 35 U.S.C. 154(b) by 791 days.

(21) Appl. No.: 10/869,939

(22) Filed: Jun. 18, 2004

(65) Prior Publication Data

US 2005/0002397 A1  Jan. 6, 2005

Related U.S. Application Data

(60) Provisional application No. 60/483,646, filed on Jul. 1, 2003.

(51) Int. Cl.
*H04L 12/28* (2006.01)
*H04J 3/16* (2006.01)

(52) U.S. Cl. .................. 370/390; 370/401; 370/468

(58) Field of Classification Search ......... 370/252–254, 370/389, 390, 400, 401, 432, 437, 468
See application file for complete search history.

(56) References Cited

U.S. PATENT DOCUMENTS

| | | | | |
|---|---|---|---|---|
| 6,633,765 | B1* | 10/2003 | Maggenti | 455/503 |
| 7,133,928 | B2* | 11/2006 | McCanne | 709/238 |
| 2002/0012322 | A1* | 1/2002 | Rooney | 370/252 |
| 2002/0067724 | A1* | 6/2002 | Helm et al. | 370/390 |
| 2002/0085506 | A1* | 7/2002 | Hundscheidt et al. | 370/254 |
| 2003/0016624 | A1* | 1/2003 | Bare | 370/217 |
| 2003/0231629 | A1* | 12/2003 | Banerjee et al. | 370/390 |
| 2004/0249810 | A1* | 12/2004 | Das et al. | 707/5 |
| 2006/0034278 | A1* | 2/2006 | Hundscheidt et al. | 370/390 |
| 2006/0062159 | A1* | 3/2006 | Jensen | 370/255 |

OTHER PUBLICATIONS

Author: William C. Fenner, Internet Group Management Protocol RFC2236, Version 2, "Internet Official Protocol Standards" (STD 1), Nov. 1997.

Cain B et al: "Request for Comments 3376: Internet Group Management Protocol, Version 3" IETF Standard, Internet Engineering Task Force, IETF, CH, Oct. 1, 2002, XP015009135 ISSN: 0000-0003.

Fenner W: "IGMPv2" IETF Standard, Internet Engineering Task Force, IETF, CH, Feb. 1997, pp. 1-24, XP015008020 ISSN: 0000-0003.

(Continued)

*Primary Examiner*—Hong Cho

(57) ABSTRACT

A method and system for querying a plurality of IGMP hosts supported by an IGMP router wherein the IGMP router logically subdivides the plurality of IGMP hosts into groups of hosts. Each group of hosts contains one or more IGMP hosts. The IGMP router sends the GMQ signal to one group of hosts at a time and the GMQs are sent at regularly spaced-apart times throughout a GMQ interval predetermined for the IGMP router. The IGMP router processes the membership report after receiving a membership report from an IGMP host. The time spacing between adjacent GMQs is equal to the length of the GMQ interval divided by the number of groups of hosts. Each group of hosts is maintained to have at least a selected number of hosts.

9 Claims, 3 Drawing Sheets

OTHER PUBLICATIONS

Xylomenos G et al: "IP multicasting for point-to-point local distribution" INFOCOM '97. Sixteenth Annual Joint Conference of the IEEE Computer and Communications Societies. Driving the Information Revolution., Proceedings IEEE Kobe, Japan Apr. 7-11, 1997, Los Alamitos, CA, USA, IEEE Comput. Soc, US, vol. 3, Apr. 7, 1997, pp. 1380-1387, XP010251982 ISBN: 0-8186-7780-5.

* cited by examiner

QUERY LOAD BALANCING FOR INTERNET GROUP MANAGEMENT PROTOCOL (IGMP) GENERAL MEMBERSHIP QUERIES (GMQS)

REFERENCE TO RELATED APPLICATION

The present application is the subject of provisional application Ser. No. 60/483,646 filed Jul. 1, 2003 entitled Audit Load Balancing for Internet Group Management Protocol (IGMP) General Membership Queries (GMQs) for which priority is claimed.

TECHNICAL FIELD OF THE INVENTION

The invention relates to the problem of performing Internet Group Management Protocol (IGMP) General Membership Queries (GMQs) on a large number of DSL (digital subscriber line) subscribers. Particularly, the invention addresses the problem of reducing the peak processing resources that are required to process the large number of membership reports that are returned in response to the GMQs.

BACKGROUND AND BRIEF DESCRIPTION OF THE INVENTION

FIG. 1 (prior art) shows the timing of GMQ procedure specified in the IGMP RFC (rfc2236—Internet Group Management Protocol, Version 2). According to the GMQ procedure, once every GMQ Interval an IGMP router broadcasts a GMQ to the hosts (e.g. set-top boxes—STB) that it services. Each host must then respond with a membership report for every channel that it is receiving. If the host is receiving multiple channels, then it randomly distributes its membership reports over a response window (e.g. 10 seconds), which begins immediately after the GMQ.

A problem with this procedure is that when there are a large number of hosts (e.g. 1000 to 2000), each of which may be receiving several channels, there are consequently a very large number of membership reports (e.g. 3000) received by the IGMP router within the response window. Since the response window is relatively short (e.g. 10 seconds) compared to the GMQ interval (e.g. 125 seconds) the peak processing requirements for processing these membership reports can be quite high.

For example, with 1000 to 2000 hosts the peak processing load could be in the order of 300 messages/second. In the case of the 7300 ASAM, it is desirable to keep the load at about 40 to 50 messages/second, so as not to affect other function being performed by the IGMP router, such as providing service to the hosts. Therefore, a way of reducing the peak load required to support GMQs is desired.

According to the invention, the peak processing load is reduced by balancing the load over the GMQ interval. This is done by logically grouping the hosts into groups, and sending a GMQ to only one group at a time, where the GMQs are sent at regularly spaced apart times throughout the GMQ interval. The hosts of each group will respond with their membership reports in the response window that follows the GMQ sent to that group. Therefore, the entire number of membership reports received during a GMQ interval will be distributed over that interval, and consequently the processing load required to process these reports will also be distributed over the GMQ interval.

The invention thus is directed to a method and system for querying a plurality of IGMP hosts supported by an IGMP router wherein the IGMP router logically subdivides the plurality of IGMP hosts into groups of hosts. Each group of hosts contains one or more IGMP hosts. The IGMP router sends the GMQ signal to one group of hosts at a time and the GMQs are sent at regularly spaced-apart times throughout a GMQ interval predetermined for the IGMP router. Finally, responsive to receiving a membership report from an IGMP host in response to a GMQ sent to a group of hosts to which the IGMP host belongs, the IGMP router processes the membership report. In addition, the time spacing between adjacent GMQs is equal to the length of the GMQ interval divided by the number of groups of hosts. In addition, each group of hosts is maintained to have at least a certain number of hosts, the certain number of hosts being the same for all groups after a maintenance operation is complete. At such time, no group of hosts will have a number of hosts that is greater than the certain number by more than one.

The logical grouping or subdividing of the hosts and scheduling of the GMQ for each host of groups is performed. That is to say, a logical grouping table has the same number of rows as there are seconds in the GMQ interval. An alternative for implementing the grouping of hosts and scheduling the GMQ for each group is that the grouping table does not have to have the same number of rows as there are seconds in the GMQ interval, that is, so the number could be the maximum number of groups allowed and the table grows to the maximum as groups are added.

Thus, the invention is directed to an improved query load balancing system for IGMP GMQs.

DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
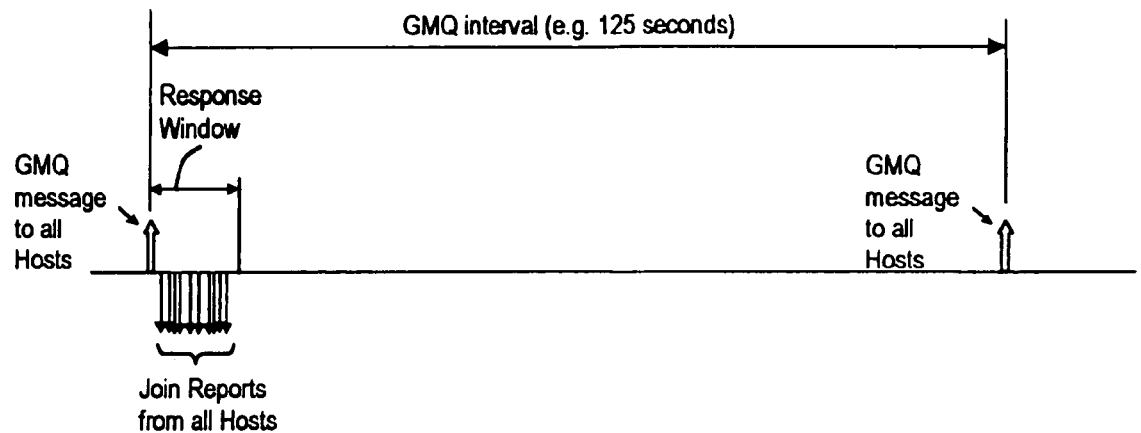
FIG. 1 shows the timing of GMQ procedure specified in the IGMP RFC (rfc2236 Internet Group Management Protocol, Version 2) and which is prior art.
Figure 2:
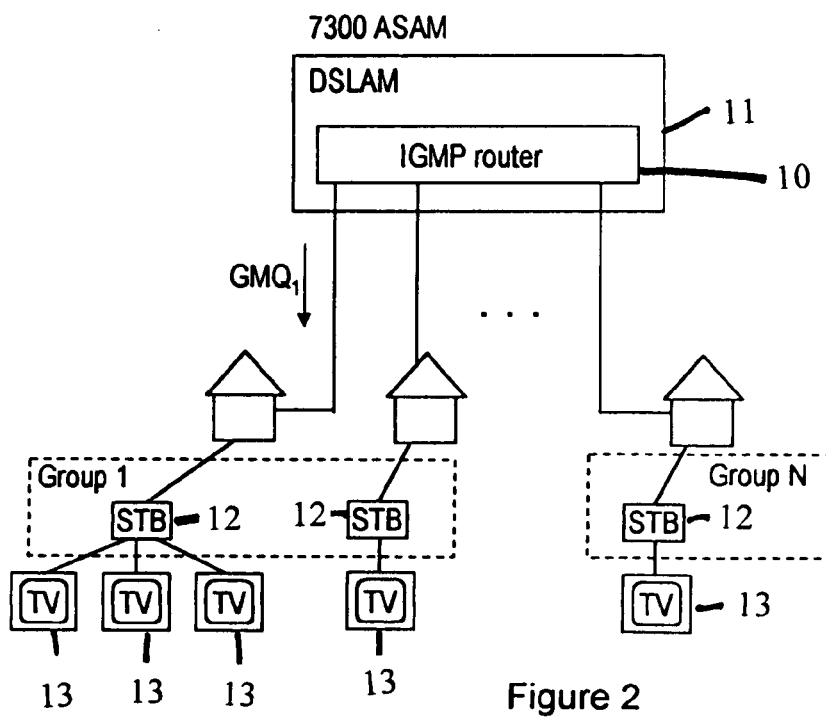
FIG. 2 shows a simplified example of a logical grouping of hosts in accordance with a preferred embodiment of the invention.

FIG. 2 shows a simplified example of the logical grouping of hosts. In the figure, an IGMP router 10 of a DSLAM 11 (e.g. 7300 ASAM) provides xDSL service to a large number of hosts 12 (e.g. STBs). Each host can support multiple user devices 13 (e.g. TVs) and receive multiple broadcast channels for this purpose. The hosts 12 are logically grouped into N groups, where each group includes one or more hosts. For example group 1 includes two hosts and group N includes only one host. As part of the GMQ procedure according to the invention, a group-specific GMQ is sent to each group, one group at a time with a regular spacing in time over the GMQ interval. For example, in FIG. 2, $GMQ_1$ is sent only to group 1.

Figure 3:
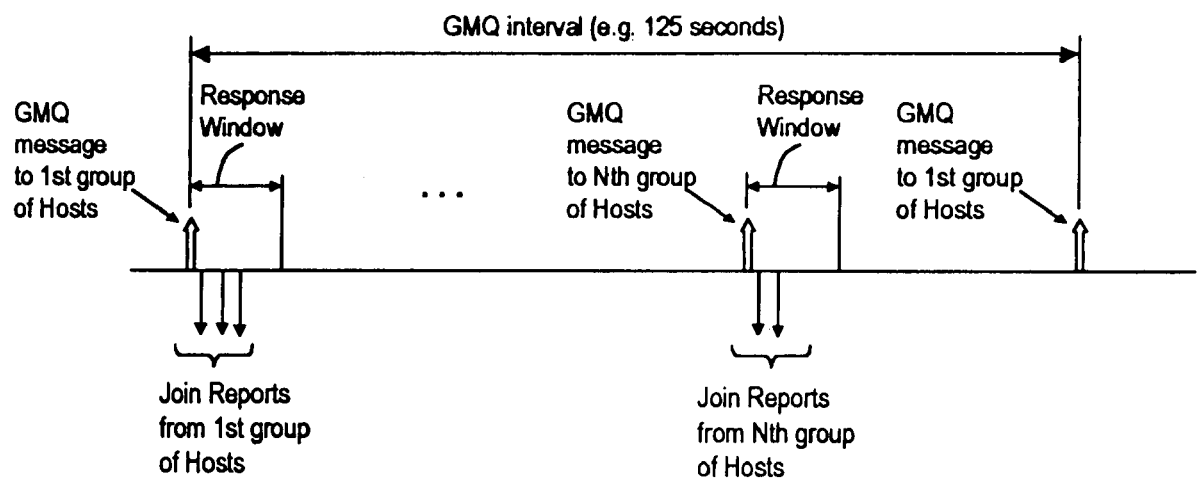
FIG. 3 illustrates an example of timing of the GMQ procedure according to the invention.

FIG. 3 shows an example timing of the GMQ procedure according to the invention. The GMQ for group 1 is sent to the hosts 12 of group 1 at the beginning of the GMQ interval, and the GMQ for group N is sent to the hosts of group N sometime nearer to the end of the GMQ interval. The GMQs for groups 2 to N−1 are spaced apart in time at equal intervals throughout the GMQ interval. That is, the time spacing between adjacent GMQs is equal to the length of the GMQ interval divided by N.

Figure 4:
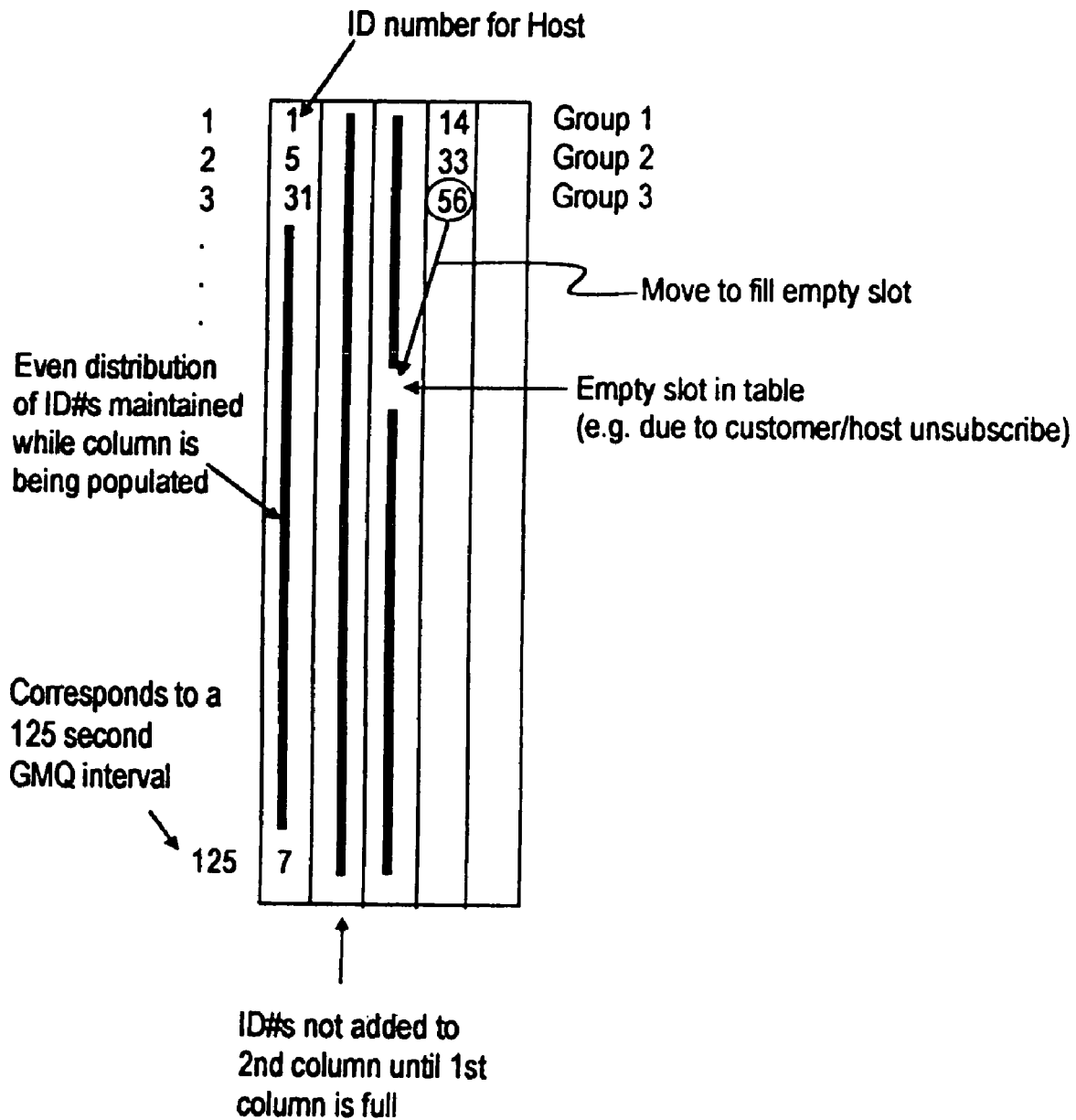
FIG. 4 illustrates an example of a table for logically grouping and scheduling the GMQ for each group.

FIG. 4 shows an example of a table for logically grouping and scheduling the GMQ for each group. The numbers in the table are the ID numbers of the hosts. Each host has a unique ID number. There are 125 rows in the table, which corresponds to a 125 second GMQ interval. Each row of the table represents a logical group of hosts. ID numbers are added to the table as hosts subscribe to the IGMP service. If possible, an evenly spaced apart distribution of ID numbers is maintained as they are added to a column. ID numbers are not added to the $2^{nd}$ column until the $1^{st}$ column is full, and likewise for succeeding columns in the table. In this way each group has, as much as possible, an equal number of hosts, which helps to balance the membership report processing load over the GMQ interval. When a host terminates its subscription to the IGMP service its ID number is removed from the table, which creates an empty slot in the table (e.g. as shown in column 3). In this case, a host ID number from a succeeding column will be moved to fill the empty slot (e.g. ID #56 is moved to the empty slot in column 3) in order maintain the approximate equality of the size of the groups.

In operation the IGMP router counts the passing seconds in a GMQ interval and compares the time with its corresponding row position in the table. If a group is defined in the table at that position (i.e. one or more ID numbers exist at that row position in the table), then the IGMP router sends a GMQ to the hosts of that group.

The invention features a system for querying a plurality of IGMP hosts supported by an IGMP router wherein said IGMP router logically subdivides the plurality of IGMP hosts into groups of hosts, each group of hosts containing one or more IGMP hosts, said IGMP router sends a GMQ to one group of hosts at a time, said GMQs being sent at regularly spaced apart times throughout a GMQ interval predetermined for each IGMP router, respectively; and, responsive to receiving a membership report from an IGMP host in response to a GMQ signal sent to the group of hosts to which that IGMP host belongs, the IGMP router processes their respective membership reports.

The invention further features such a system wherein the time spacing between adjacent GMQs is equal to the length of the GMQ interval divided by the number of groups of hosts.

The invention further features such a system wherein each group of hosts is maintained to have at least a certain number of hosts, said certain number of hosts being the same for all groups after a maintenance operation is complete, and at such time no group of hosts will have a number of hosts that is greater than the greater number by more than one.

The invention further features such a system wherein said hosts are subdivided in a GMQ for each group of hosts and scheduled according to a table having the same number of hosts as there are seconds in the GMQ interval.

The invention further features such a system wherein said hosts are grouped and the scheduling of said GMQs reach hosts according to a table which has the same number of rows as there are seconds in the GMQ interval.

Finally, the invention features a method for querying a plurality of IGMP hosts supported by an IGMP router characterized in that said IGMP router logically subdivides the plurality of IGMP hosts into groups of hosts, each group of hosts containing one or more IGMP hosts; said IGMP router sends a GMQ to one group of hosts at a time, said GMQ being sent at regularly spaced-apart times throughout the GMQ interval predetermined for the IGMP router, and responsive to receiving a membership report from an IGMP host in response to a GMQ sent to the group of hosts to which that IGMP host belongs, the IGMP router processes the membership report.

While the invention has been described in relation to preferred embodiments of the invention, it will be appreciated that other embodiments, adaptations and modifications of the invention will be apparent to those skilled in the art.

What is claimed is:

1. A method of query load balancing for Internet Group Management Protocol (IGMP) General Membership Queries (GMQs) on a large number of DSL (digital subscriber line) subscribers, the method comprising:
   reducing a peak processing load by balancing the load over a GMQ interval by logically grouping a plurality of hosts into groups;
   sending a GMQ to only one group at a time at regularly spaced apart times throughout the GMQ interval, the time spacing between adjacent GMQs being equal to the length of the GMQ interval divided by the number of groups of hosts; and
   responding, by the hosts of each group, with corresponding membership reports in a response window that follows the GMQ sent to that group, whereby transmission of the reports is distributed over the GMQ interval and a processing load required to process the reports distributed over the GMQ interval.

2. The method defined in claim 1 wherein:
   each group of hosts is maintained to have at least a certain number of hosts, the certain number of hosts being the same for all groups after a maintenance operation is complete,
   no group of hosts will have a number of hosts that is greater than the number by more than one, and
   said hosts are subdivided in a GMQ for each group of hosts and scheduled according to a logical grouping table.

3. The method defined in claim 2, wherein said logical grouping table has the same number or rows as there are seconds in the GMQ interval.

4. The method defined in claim 2, wherein the logical grouping table is not required to have the same number of rows as there are seconds in the GMQ interval, such that the number could be a maximum number of groups allowed and the table grows to the maximum as groups are added.

5. A system for reducing peak processing load required to process Internet Group Management Protocol (IGMP) General Membership Queries (GMQs), the system comprising:
   a plurality of IGMP hosts;
   an IGMP router; and
   respective connections between said IGMP router and each of said IGMP hosts, wherein:
   the IGMP router logically subdivides the plurality of IGMP hosts into groups of hosts, each group of hosts containing one or more IGMP hosts,
   the IGMP router is adapted to send a GMQ signal to one group of hosts at a time and the GMQs are sent at regularly spaced-apart times throughout a GMQ interval predetermined for the IGMP router, the time spacing between adjacent GMQs being equal to the length of the GMQ interval divided by the number of groups of hosts,
   each of the IGMP hosts is adapted to, in response to receipt of a GMQ signal in the group of hosts to which the IGMP host belongs, send a membership report to the IGMP router indicating members for each channel received by the IGMP host, and
   the IGMP router is adapted to receive the membership report from an IGMP host in response to a GMQ sent to a group of hosts to which the IGMP host belongs, and to process the membership report.

6. The system defined in claim 5 wherein:

each group of hosts is maintained to have at least a certain number of hosts, the certain number of hosts being the same for all groups after a maintenance operation is complete, no group of hosts will have a number of hosts that is greater than the certain number by more than one, and said hosts are subdivided in a GMQ for each group of hosts and scheduled according to a logical grouping table.

7. The system defined in claim 6 wherein the logical grouping table has the same number of rows as there are seconds in the GMQ interval.

8. The system defined in claim 6 wherein the logical grouping table is not required to have the same number of rows as there are seconds in the GMQ interval, such that the number could be a maximum number of groups allowed and the table grows to the maximum as groups are added.

9. A method for query load balancing for Internet Group Management Protocol (IGMP) General Membership Queries (GMQs) in a system including a plurality of IGMP hosts supported by an IGMP router, the method comprising:

logically subdividing, by the IGMP router, the plurality of IGMP hosts into groups of hosts, each group of hosts containing one or more IGMP hosts;

sending, by the IGMP router, a GMQ signal to one group of hosts at a time, said GMQs being sent at regularly spaced-apart times through a GMQ interval predetermined for the IGMP router, the time spacing between adjacent GMQS being equal to the length of the GMQ interval divided by the number of groups of hosts;

sending, in response to receipt of a GMQ signal in the group of hosts, a membership report to the IGMP router; and processing the membership report after receiving the membership report from an IGMP host, wherein each group of hosts is maintained to have at least a selected number of hosts.

* * * * *

UNITED STATES PATENT AND TRADEMARK OFFICE
CERTIFICATE OF CORRECTION

PATENT NO. : 7,593,401 B2 Page 1 of 1
APPLICATION NO. : 10/869939
DATED : September 22, 2009
INVENTOR(S) : Poulsen et al.

It is certified that error appears in the above-identified patent and that said Letters Patent is hereby corrected as shown below:

Column 4, line 26, insert --is-- before "distributed",

Column 4, line 33, insert --certain-- before "number", and

Column 4, line 37, delete "or" and insert --of-- therein.

Signed and Sealed this

Seventeenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,593,401 B2  Page 1 of 1
APPLICATION NO. : 10/869939
DATED : September 22, 2009
INVENTOR(S) : Poulsen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1460 days.

Signed and Sealed this

Twenty-first Day of September, 2010

David J. Kappos
*Director of the United States Patent and Trademark Office*